June 7, 1949. K. W. STOOKEY 2,472,497
FURNACE
Filed Jan. 28, 1946 3 Sheets-Sheet 1

INVENTOR:
KENNETH W. STOOKEY
BY Ely & Frye
ATTORNEYS

June 7, 1949.  K. W. STOOKEY  2,472,497
FURNACE
Filed Jan. 28, 1946  3 Sheets-Sheet 2
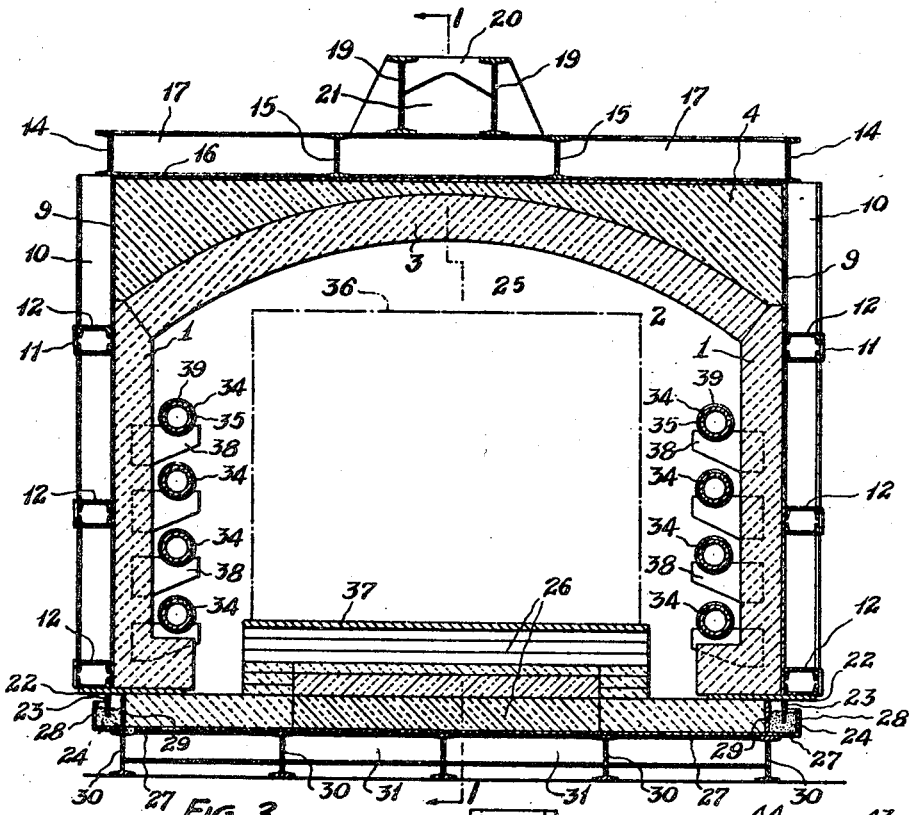
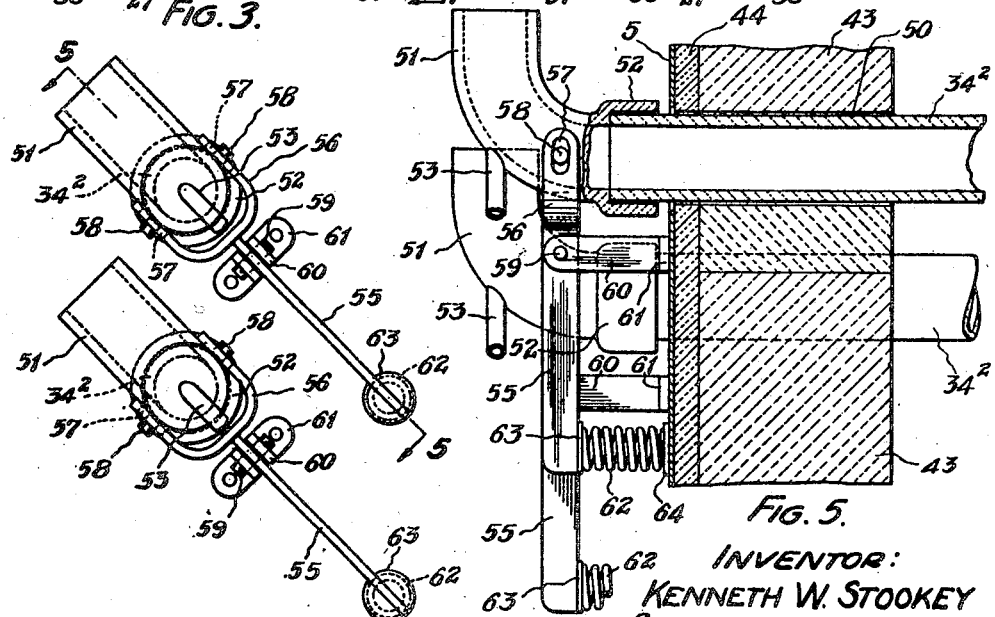
INVENTOR:
KENNETH W. STOOKEY
BY Ely & Frye
ATTORNEYS June 7, 1949.  K. W. STOOKEY  2,472,497
FURNACE Filed Jan. 28, 1946  3 Sheets-Sheet 3

INVENTOR.
KENNETH W. STOOKEY
BY
Ely & Frye
ATTORNEYS

Patented June 7, 1949

2,472,497

UNITED STATES PATENT OFFICE 2,472,497

FURNACE

Kenneth W. Stookey, Shaker Heights, Ohio, assignor to The Gas Machinery Company, Cleveland, Ohio, a corporation of Ohio Application January 28, 1946, Serial No. 643,914

19 Claims. (Cl. 263—42)

This invention relates to heating apparatus, and more particularly to heating furnaces in which the heat is supplied from one or more heated tubes in the furnace. This application is a continuation in part of my application Serial No. 528,815, filed March 31, 1944, now abandoned.

There is an increasing industrial use of furnaces in which the work to be heated is disposed in a furnace chamber to which heat is supplied largely by radiation from tubes which extend through the furnace and which are heated by hot gases, preferably incandescent burning gases, passing through the tubes. Such furnaces, generally referred to as "radiant tube furnaces," are used where the atmosphere in the furnace must be controlled or where products of combustion must be kept from contact with the work.

The problems involved in the design, construction and maintenance of the tubes in radiant tube furnaces are extremely difficult of solution because of the severe service requirements imposed.

It is often desired to employ such furnaces at temperatures as high as 3000° F. for several months at a time. Therefore, the material of which the tubes are formed should, to as great an extent as possible, be heat resistant, chemically inert, and free of any tendencies to crack, spall, corrode or otherwise deteriorate. Moreover, since the heat supplied to the furnace chamber is that which passes through the tube walls, the material of which the tubes are formed should have good heat conductivity.

When a radiant tube furnace is heated from room to operating temperature and then cooled to room temperature, as well as when temperature variations occur during the heating operations, both the furnace walls and the tubes change dimensions and shape due to expansion or contraction. Because of the large temperature variations involved, these changes in dimensions and shape are considerable. When the radiant tubes are supported from the furnace walls, as is usually the case, such changes in the shape and dimensions of the tubes and the furnace walls all result in substantial changes in the relative positions of the walls, the tubes, and the tube supports. Such changes are, of course, unavoidable. This makes it important that the tubes and their supports be capable of accommodating themselves to such changes; otherwise the tubes will rupture or tear loose from their supports.

Such temperature changes also tend to cause changes in the structural strengths of the tubes, furnace walls, and supports, which tend to accentuate the possibilities of failure.

It is desirable that the tubes be supported in the furnace at spaced points in such manner that the supporting means will mask or block to a minimum extent the tube walls from which heat is radiated. This requires that the tubes be strong enough to withstand the stresses incident to being so supported at the high temperature and the stresses resulting from the above mentioned changes in relative positions of the tubes, supports and furnace walls due to the expansion and contraction of the furnace walls and tubes.

It has been proposed to employ in radiant tube furnaces tubes of non-metallic, refractory material because of the chemical inertness, resistance to corrosion, and potential long life of such tubes. However, the use of such tubes has been accompanied with difficulties. Refractory materials in general are rigid and of low elasticity. Tubes formed therefrom will tend to crack or break readily under the stresses of use. Moreover, tubes of such refractory material are generally available only in short lengths, necessitating the use of jointed sections to make up a heating tube long enough for the usual furnace; the problem of providing joints between sections which would be tight and effective over the ranges of temperature has not been satisfactorily solved heretofore. This problem was complicated because, in addition to the relative motion or "weaving" of the tubes, walls, and supports indicated above, the sections of the tube also tend to move with respect to each other under temperature variations. If the tube section joints were made rigid to obtain tight joints, such weaving would cause the tube to fracture, usually at the joints. Even disregarding such weaving, misalignment of the supports for rigid tubes of such refractory material, often unavoidable in constructing the furnace, can crack the tubes, due to tensile stresses induced by the misalignment.

Because of the above difficulties with tubes formed of inorganic refractory material, it has been the usual practice to employ radiant tubes formed of metal, usually special, expensive, high temperature chromium alloys. Such tubes may be obtained in any desired lengths, so that the necessity of using jointed sections in a tube is obviated. Moreover, such a tube has sufficient strength and flexibility to withstand without damage thereto changes in its position relative to its supports and to the furnace walls during temperature changes. However, under the high temperature and other severe operating conditions to which they are subjected in such furnaces, such tubes corrode, oxidize, scale and warp at a rapid rate, so that they deteriorate rapidly to the point of failure. Failure of a tube, resulting in the escape of gases therefrom, causes considerable trouble in furnaces in which the atmosphere must be controlled and in furnaces in which the products of combustion must be prevented from contacting the work; such failure may result in damage to or destruction of work which is of far greater value than the tubes. Even if the tubes are replaced before failure, the frequent replacement necessary with alloy tubes adds greatly to the cost of operation, because of the cost of tubes, the labor of replacing them, and the loss of furnace operating time.

It is an object of this invention to provide a furnace in which the heat is supplied from one or more heated tubes which are free of the above outlined disadvantages of the prior art radiant tubes.

It is another object of this invention to provide such a furnace in which the tubes have greatly increased life, desirable heat transfer characteristics, economical maintenance characteristics, and other advantages.

It is a further object of this invention to provide a flexible tube which is formed of a plurality of short sections, of non-metallic refractory material and which is capable of adjusting itself to various positions during operation of the furnace.

According to this present invention, a furnace is provided in which heat is supplied to work in the furnace largely by radiation of heat from one or more tubes which have passing therethrough hot fluids such as burning or other heated gases. Each of said tubes comprises a plurality of tubular sections having mating ball and socket joints which are gas tight so that adjacent tube sections are capable of universal angular movement with respect to each other without permitting the escape of gases from the tube. To maintain the mating surfaces of the tube sections in contact, even though they move angularly with respect to each other or even though the tube lengthens or shortens due to expansion or contraction, at least one end of the tube is provided with means to maintain a longitudinal compression load on the tube, while the other end of the tube is provided with means to oppose the compression load. The several sections of the tube are supported, advantageously, from a wall of the furnace by suitable supporting members permitting limited movement of the sections. Advantageously the supporting members are located at or in the vicinity of the joints between the tube sections and are constructed to permit limited movement of the section ends in all directions without permitting sufficient movement to open the joints or to buckle the tube.

Preferably the mating surfaces of adjacent tube sections forming each ball and socket joint are so formed, as by grinding, that they fit closely enough to form a gas tight joint. It has also been found advantageous to seal the joints by a cement which will be plastic at the temperatures at which the tube sections start to move out of alignment, as well as at elevated operating temperatures, but which will not become so fluid as to run off the joint; preferably, such cement is contained between the mating surfaces of the joint. Materials suitable for such cements which will have suitable plasticity and viscosity characteristics in the necessary range of elevated temperatures are known to those skilled in the art. Examples are suitable glasses or other ceramic materials, or suitable salts or oxides.

Each of the tube sections advantageously is formed of a suitable refractory material having suitable strength, toughness, heat resistance, and heat conductivity; preferably the refractory material is a non-metallic, inorganic material which is chemically inert and does not oxidize, corrode, scale or blister. Extremely advantageous results are obtained when the tube sections are formed of material consisting wholly or predominantly of silicon carbide fused with or without a ceramic binding material sufficiently to make a hard, strong, tough and heat-resistant material; such material hereinafter for consistence will be referred to as silicon carbide, although it may contain a minor proportion of other material such as fused ceramic material. Silicon carbide tube sections are extremely strong in compression, and have substantial strength in tension; this material does not decrease in strength at elevated temperatures but on the contrary, may increase in strength, reaching maximum strength at about 2600° F. It is quite tough, and does not crack or spall at elevated temperatures or even at unduly and rapidly varying temperatures. It is chemically inert, and does not oxidize, corrode, scale, blister, or otherwise deteriorate under high temperatures and when subjected to oxidizing or corrosive gases. For a non-metallic material, it has good heat conductivity, which enables it to transmit readily through the walls of the tube the heat of the hot or burning gases in the tube and which enables it to resist cracking even when subjected to substantial temperature differentials. Tubes formed of silicon carbide have an extremely long life when used in furnaces of the kind mentioned above.

Numerous and far reaching advantages are provided by the construction of the invention. Because of the above described ball-and-socket joints between the tube sections, the means for supporting the tube sections, and the means which exerts longitudinal compression on the tube sections, the tube sections can readily change positions relative to each other to their supporting means and to the furnace wall if the tube is supported therefrom; such change in position is accomplished without leakage of gas from the inside of the tube into the furnace. Consequently, when due to expansion or contraction of the tube, the furnace walls, or the supporting members for the tube, the tube changes length or the points of support of the tube change position, the tube sections adjust themselves accordingly while still maintaining a continuous passage therethrough for hot gases. No leakage of gases results and the tube does not crack or fracture at any point due to such position changes.

Therefore, the present invention makes possible the construction of a satisfactory tube from a plurality of short sections of inorganic refractory material, such as silicon carbide, which are readily available in such short sections at low cost, and which has the above-indicated advantages of excellent heat resistance, chemical inertness, resistance to spalling and other deterioration, and long life. The invention thus makes possible the use of tubes which are free of the previously mentioned disadvantages of metal tubes.

Furnaces embodying one or more tubes of the invention may be constructed at low cost, and have exceptionally low operating costs because of the extremely long life, efficient heat transfer, and economical maintenance characteristics of such tubes, which need be replaced very seldom if at all.

These and other objects, features and advantages of the invention will be apparent from the following description of a preferred embodiment of the invention in connection with the accompanying drawings, and from the appended claims. In the drawings:

Fig. 3 is a vertical section through the furnace of Fig. 1, along line 3—3 of Fig. 1 and to the same scale as that of Fig. 1;

Fig. 4 is an end elevation of the means embodied in the apparatus of the drawings, for exerting a longitudinal compressive force on the tubes, this elevation being taken along line 4—4 of Fig. 1 and being to a larger scale than that of Fig. 1;

Fig. 5 is a section of a fragmentary portion of the end of the furnace at which the compressive means of Fig. 4 is located, this section being taken along line 5—5 of Fig. 4, and being to the same scale as that of Fig. 4;

Figure 6:
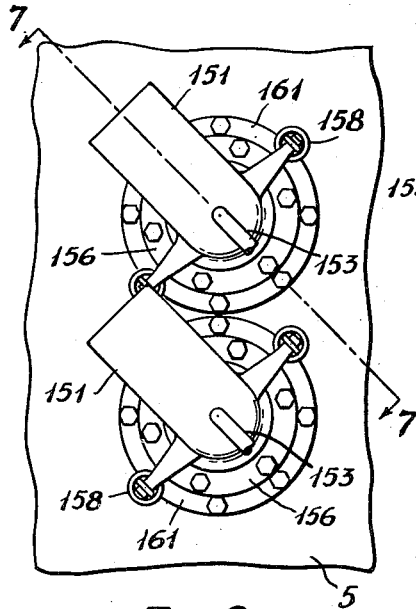
Figure 7:
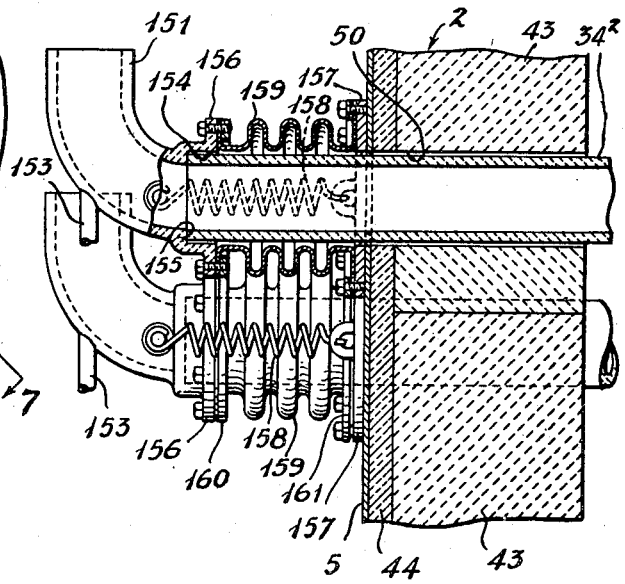

Fig. 6 is an end elevation, corresponding generally to Fig. 4 and to the same scale, of a portion of one end of the furnace embodying a different type of compressive means for the tubes and means for sealing the movable tube ends to the furnace; and Fig. 7 is a section, along line 7—7 of Fig. 6 and to the same scale, showing the modified structure at the ends of the tubes and a portion of the associated furnace wall through which the end tube sections project.

In the drawings, the same parts are indicated by the same reference characters in all views.

The furnace shown in the drawings includes a removable hood structure comprising side walls 1 and end walls 2 formed of refractory material such as fire brick, and a roof wall formed of an arched portion 3 of refractory material such as fire brick and covered with a mass of refractory heat insulating material. Said removable hood structure also includes a metal reinforcing structure which is fixed to and supports and reinforces the side, end, and roof walls of the furnace. The portion of the reinforcing structure associated with each of end walls 2 comprises a metal plate 5 secured to the exterior surface of the wall, and having fixed to its outer surface a plurality of vertical beams 6 and a plurality of horizontal beams 7 extending between vertical beams 6; each of beams 7 comprises two opposed channel beams which have welded thereto a plate 8 to form a box beam, and which are also welded to plate 5 and vertical beams 6. The portion of the reinforcing structure associated with each of side walls 1 similarly comprises a plate 9 secured to the exterior surface of the wall, a plurality of vertical beams 10 fixed to the exterior surface of the plate 9, and a plurality of beams 12 extending horizontally between the beams 10 and fixed thereto and to the plate 9, each of which beams 12 consists of two opposed channel beams having a plate 11 welded thereto to form a box beam.

The portion of the reinforcing structure associated with the top wall of the furnace comprises: transverse beams 13 each of which is mounted along an end of the top wall and is fixed to the top ends of the vertical beams 6 associated with the corresponding end wall 2; longitudinal beams 14 each of which is mounted along a side of the top wall and is fixed to the top ends of the vertical beams 10 associated with the corresponding side wall 1; intermediate longitudinal beams 15 which are fixed at their ends to transverse beams 13 and along their length to a plate 16 secured to the outer surface of the top wall of the furnace; intermediate transverse beams 17 fixed to plate 16 and at their ends to longitudinal beams 14 and 15; and longitudinal deep-section beams 19 which are fixed to transverse beams 13 and 17 and which are connected by a web 20 fixed thereto whose lower edge is shaped to provide a slot 21 by means of which the hood structure as a whole may be lifted.

The base of the hood structure includes metal plates 22 located at beneath the side walls 1 and end walls 2. The plate 22 at the bottom of each of side walls 1 is fixed to the lower portions of the vertical beams 10 and to the lowermost horizontal beam 12 for said wall; the plate 22 at the bottom of each of end walls 2 is fixed to the lower portions of vertical bearing 6 and to the lowermost horizontal beam 7 for said wall. The plates 22 thus provide support for their respective furnace walls from the reinforcing structure, and serve to protect the bottom surfaces of said walls from wear when the hood structure is seated on a furnace base. The plates 22 carry depending flanges 23 adapted to dip into a channel in the furnace base containing sealing material.

In the illustrated apparatus, said hood structure rests upon a furnace base which comprises a composite member 26 of refractory material such as tile and fire brick, supported on a metal plate 27 carried by longitudinal supporting beams 30 and transverse reinforcing beams 31. A hearth plate 37, formed of metal or refractory material, adapted to support the work to be heated, is shown as supported on a hearth portion of the member 26.

The edge of said furnace base has extending therearound a channel 24 for sealing material, which is formed by an upwardly extending peripheral flange 28 on said plate 27 and a metal plate 29 spaced inwardly therefrom and located at the periphery of composite member 26. Said channel 24 contains sealing material such as sand into which dip the lower edges of said depending flanges 23 mounted on the bottom plates 22 of the hood structure, thus forming a substantially gas tight seal between said hood structure and said furnace base when said hood structure is resting on said furnace base as shown in Figs. 1 and 3 of the drawings.

When the hood structure is resting on said furnace base, the side walls 1, end walls 2 and roof wall of the hood structure, and the furnace base define a heating chamber 25. Work to be heated is disposed in said chamber; the broken lines 36 shown in Figs. 1 and 3 indicate such work supported by hearth plate 37.

The illustrated furnace comprises a plurality of heating tubes 34 in the heating chamber 25, said tubes being included in the hood structure. The tubes are shown as being horizontally disposed, a plurality of tubes being arranged in a bank in superposed relation along and supported from each side wall 1 of the hood structure. Each of said tubes is provided at one end with a suitable burner 47 from which fuel gas and air are supplied to the interior of the tube in proper proportions for combustion, and at the other end with an exhaust flue member for drawing the mixture of gases through the tube and for exhausting the products of combustion; the mixture of gas and air is burned in the tube and heat from the burning gases in the tube is conducted through the tube wall to the surface thereof from which the heat is transmitted to the work being heated, by radiation and by conduction by the air or other gas in the heating chamber 25.

Figures 1, 2:
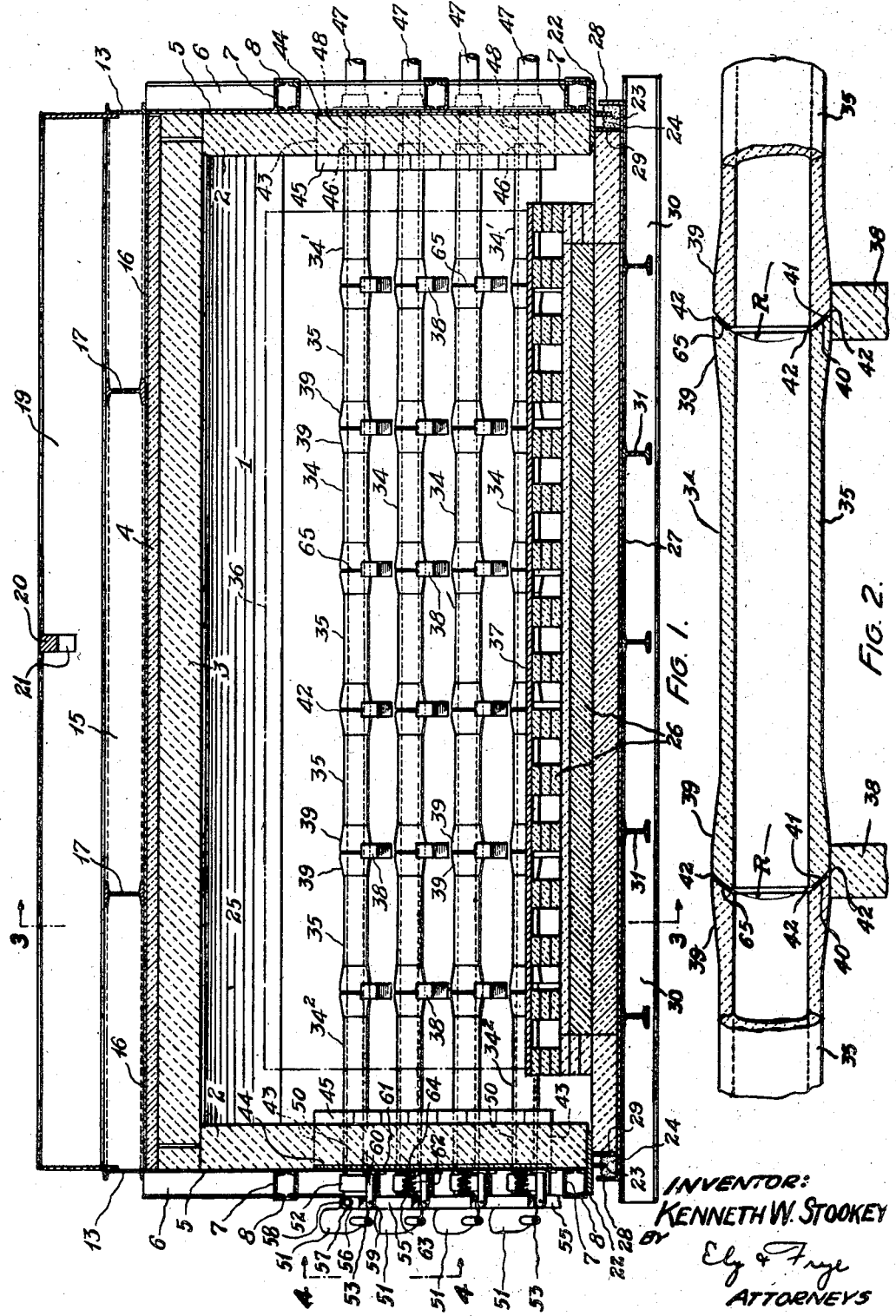
Fig. 1 is a sectional elevation, along line 1—1 of Figure 3, of a furnace embodying the invention.
Fig. 2 is an axial sectional elevation, to a scale larger than that of Fig. 1, of a portion of a tube embodying the invention, showing the ball-and-socket joints at the ends of a tube section and portions of two supporting members for the tube.

More specifically and as is shown to advantage in Figs. 1 and 2, each tube 34 is formed of a plurality of tube sections 34¹, 34² and 35 disposed and abutting in end-to-end relation. These sections are formed of suitable refractory material, such as silicon carbide. The adjacent end portions of adjacent tube sections have mating annular surfaces, one of which is a concave surface 40 and the other of which is a convex surface 41 so as to form a ball-and-socket joint permitting universal angular movement of such adjacent tube sections relative to each other. Each of said annular surfaces lies in the surface of a sphere of a radius R (Fig. 2). The radii R of the concave surface 40 and convex surface 41 are preferably equal particularly, if the surfaces 40 and 41 directly contact; but the radius R of the convex surface may be slightly smaller than the radius R of the concave surface if said surfaces are slightly separated by sealing material 65 as hereafter described, in order to provide a uniform spacing between said surfaces on movement of adjacent tube sections relatively to each other. Therefore the mating annular surfaces are substantially portions of concentric spheres. The radius R of each of the concave and convex surfaces is shown as being substantially larger than the radius of the tube sections adjacent the joint; this is advantageous since it reduces the amount of curvature and reduces possibility of spalling or chipping of the tube sections in the vicinity of the surfaces, particularly in the vicinity of the edges of the concave surfaces.

In order to reduce even further the possibility of spalling or chipping of the tube sections at the outer edges of the concave surface, such edges are square cut in the illustrated embodiment as shown at 42 of Fig. 2.

In the illustrated embodiment, each pair of mating annular concave surfaces 40 and 41 are accurately formed, as by being ground and lapped together, so that when the tube sections embodying these surfaces are assembled in the form of a tube the surfaces cooperate to form gas-tight, leak-proof joint over a wide range of relative positions of the tube sections. When the surfaces 40 and 41 of each joint are formed with sufficient accuracy, they may bear directly against and contact each other over substantially their entire areas to form the desired gas-tight, leak-proof joint over a wide range of relative positions of the tube sections embodying said surfaces. However, it is advantageous in providing a leak-proof, gas-tight joint if there is disposed between each pair of mating annular surfaces sealing material 65 which contacts these surfaces over a substantial area of each. This material is a heat resisting material, such as a ceramic material, salt, or oxide, which at and above the temperature at which the tube sections move relative to each other is a plastic mass of sufficient viscosity so that it does not flow out of the joint; in general the material should be such that it will have such plasticity and viscosity in a range of temperatures lying between about 800° F. and about 3000° F. Of course, similar material may be disposed on the outer surfaces of the tube section in the vicinity of the joint, so as to form a mass of sealing material in which are embedded the ends of the tube sections forming a ball-and-socket joint.

Each tube section is shown as having an enlarged portion 39 at the end of the tube section having a concave surface 40 or a convex surface 41; such enlarged portion provides increased thickness and strength of the tube section at this portion, and an increased width and area of the concave or convex end surface of the tube section.

Between the end tube sections 34¹ and 34², each of the illustrated tubes 34 made up of such end tube sections and intermediated sections 35 is supported by spaced supporting members 38 fixed by a side wall 1 of the furnace and located at the ball-and-socket joints between adjacent tube sections. More specifically, each supporting member 38 is rigidly fixed to the side wall 1 of the furnace and is so located and of sufficient width that it extends over the end portions 39 of two adjacent tube sections; moreover, as shown in Figs. 2 and 3, each supporting member 38 is recessed so as to prevent the ends of the tube sections and the ball-and-socket joint formed thereby from moving sufficiently with respect to the supporting member 38 or wall 1 to cause buckling of the tube 34, while permitting limited movement of such tube section ends in directions transverse of the tube. The illustrated supporting members 38 are open-topped, since the weight of the tube-sections resting thereon will prevent the tube sections from moving sufficiently in a vertical direction to cause buckling, but it is obvious that the supporting member 38 could be formed with portions extending over the tops of the tube sections to limit positively movement of the tube sections. The tube sections, furthermore, are slidably supported on member 38, being restrained against more than limited endwise movement with respect to the members 38 and walls 1 by the means hereinafter described. Consequently the ball-and-socket joints are capable of limited movement in all directions.

In the illustrated embodiment, each of the tubes 34 is provided with means for exerting a longitudinal compressive force on the tube which maintains tight joints between the tube sections. To this end, one end section 34¹ of the tube 34 is mounted so that it bears against a fixed portion of an end wall 2 of the hood structure; as shown in Fig. 1 in the illustrated furnace each end section 34¹ of each of the plurality of tubes 34 is seated in a recess 46 in a wall section member 43; member 43 is formed of refractory material and located in a recess in an end wall 2 between shoulder members 45 formed on said wall and plate 44 of heat-insulating material adjacent the inner surface of metal plate 5 of the reinforcing structure described above; a passage 48 through wall section member 43 connects the interior of each tubular end section 34¹ with its corresponding burner 47.

As shown in Figs. 1 and 5, the tubular end section 34² at the opposite end of each tube 34 passes through and is slidably mounted in an opening 50 extending through a wall section member 43 and refractory plate 44 in end wall 2 which are similar to those described above as being located in the other end wall 2. An exhaust flue member 51 is mounted by means of flanged collar portion 52 on the projecting end of the tube section $34^2$, said projecting end being seated in a recess and bearing against a shoulder in said collar portion 52 as shown in Fig. 5. As is shown in Figs. 1, 4 and 5, associated with each flue member 51 is a lever 55 which is pivoted about pin 59 passing through the lever and spaced lugs 60 of a support 61 fixed to the plate 5 associated with the end wall 2 of the hood structure. The portion of the lever 55 extending above the pin 59 is formed with a yoke 56 having in the end portion of its arms elongated slots 57, which have slidably mounted therein pins 58 rigidly fixed to the flue member 51. The lower end of the lever 55 is provided with a spring seat 63 against which bears one end of a coil spring 62 the other end of which bears against spring seat 64 fixed to the plate 5 associated with end wall 2. The coil spring 62 pressing against the end of lever 55 urges the flue member 51 against the end of tube sections $34^2$. Hence there is maintained on the tube 34 a longitudinal compressive force, which is resisted by the end section $34^1$ which bears against the associated end wall 2 of the the hood structure, and which causes the abutting ends of the tube section to be pressed tightly together to form gas-tight and leak-proof joint therebetween. The illustrated means maintains such compressive force despite movement of the end tube section $34^2$ because of expansion or contraction of the tube 34 or the furnace walls. As shown in Fig. 4, the flue members 51 and levers 55 for each tube 34 in the vertical bank at each side of the furnace, are disposed at an angle to the vertical to prevent interference between these elements of adjacent tubes.

The exhaust flue member 51 for each tube 34 in the illustrated embodiment is shaped to discharge the exhaust gases upwardly, and is provided with a syphon vent tube 53 extending into the flue member toward its discharge orifice. Vent tube 53 is adapted to be connected to a source of relatively high pressure steam, air or other gas, the discharge of which through the tube 53 will maintain a partial vacuum or sub-atmospheric pressure in tube 35 and cause the combustion gases to flow through the tube 35 and be discharged through the exhaust flue member 51. When a partial vacuum or sub-atmospheric pressure is thus maintained in the tube, no gases can escape from the tube into the furnace even if leaks should be present.

In operation of the apparatus discussed above, the hood structure as a whole, comprising side walls 1, end walls 2, the top wall, the reinforcing structure associated with said walls and the vertical banks of tubes 35 associated with each of side walls 1, is lifted as by means of a grab hook fitting in slot 21 and bearing against member 20. The work 36 to be heated is then placed on the hearth plate 37 of the furnace base, and the hood structure is lowered so that, as shown in Figs. 1 and 3, the plates 22 rest on the furnace base and the depending flanges 23 dip into sealing material such as sand in channel 24 of the furnace base to form a substantially gas-tight seal. Steam or other gas under pressure is injected through vent tube 53 of each exhaust flue member 51, which causes between the inlet and exhaust ends of the tube 34 a pressure differential causing a flow of gas through the tube. A combustible mixture of gases is introduced into each tube and ignited from the burner 47 associated with the tube. A burning mixture of gases therefore passes through each tube 34 from the end at which the burner 47 is disposed to the end at which the exhaust flue member 51 is disposed, and is exhausted through member 51. Heat passes through the walls of tubes 34 and is transmitted by radiation and by conduction through the air or other gas in the furnace to the work 36.

While the furnace is heating from room temperature to its maximum temperature, the walls of the furnace expand and distort, and the supporting members 38 fixed thereto change locations and also expand and distort. The sections $34^1$, 35 and $34^2$ of each tube 34 also expand, so that the tube increases in length. The tube sections, and each tube as a whole, are free to move to compensate for such changes. Such compensation occurs by angular relative movement of the tube sections at the ball-and-socket joints, and by sliding if necessary of the tube sections relative to their supports and to their supporting side walls. Any changes in size or position of the tube sections, furnace walls, or supporting members for the tubes due to temperature changes during the heat treating operation, or during cooling are similarly compensated for any movement of the tube sections relative to each other, their supports, or furnace walls.

Although the supporting members 38 permit limited movement of the tube sections at the joints, they do not permit buckling of the tubes. Springs 62 and levers 55 operating through flue sections 51 maintain a compressive force on the tubes 34 throughout such changes in lengths of tubes 34 and changes in positions of the tube sections making up the tubes, and hold the tube sections so tightly together that leaks are prevented.

After the heating operation is completed, the hood structure is lifted and the heat treated work removed. The furnace is then ready for use again.

In the illustrated apparatus, one or both of the end tube sections $34^1$ and $34^2$ may be formed of a non-metallic inorganic refractory material, such as tile, of poor heat conductivity, or a heat conductivity substantially less than that of silicon carbide. The use of such poorly conducting end tube sections provides advantages in reducing the amount of heat conducted by the tube sections to the furnace walls and to the parts such as the burners, flues or compressive means connected to or associated with the end tube sections, thus reducing the possibility of damage to or deterioration of the walls and such parts due to heat.

Figs. 6 and 7 illustrate a modified form of compressive means which may be employed at the floating end of each tube, as well as a seal to prevent the escape of hot gases past the tube from the furnace and the entrance of air into the furnace. In the structure shown in these figures, the end of the end tube section $34^2$ of each tube 35 projects through and is slidably mounted in an opening 50 in refractory wall section member 43, refractory plate 44 and metal reinforcing plate 5. This end tube section $34^2$ advantageously is formed of a material of poor heat conductivity, as described above. An exhaust flue member 151, provided with a vent tube 153, is mounted on the projecting end of the tube section, the end of the tube section fitting in a recess 154 in the flue member and bearing against a shoulder 155 therein. The flue member 151 is formed with a radially extending flange 156 adjacent the portion where the end of tube section 34² enters the flue member. A corresponding flange 157 is fixed to the metal reinforcing plate 5 of the furnace wall and surrounds the projecting end of the tube section 34². A plurality of tension springs 158 are connected to the flanges 156 and 157, and serve thus to maintain a continuous compressive force on the tube section 34² and the tube 35 of which said tube section forms a part. Surrounding the projecting end of tube section 34² and extending between the flanges 156 and 157 is an expansible and contractible metal bellows sleeve 159 which is preferably formed of heat-resistant material such as stainless steel. In the illustrated embodiment the bellows sleeve 159 is provided at its ends with radial flanges 160 and 161 which are respectively bolted to the flanges 156 and 157. The bellows sleeve 159 thus provides a gas-tight seal between the end section 34² of tube 35 and the atmosphere.

As the tube section 34² slides in opening 50 relatively to the wall 2 due to expansion and contraction of the furnace parts, a continuous compressive stress is maintained on the end of the tube sections by the tension springs 158 which tend to draw the flanges 156 and 157 together; meanwhile, the bellows sleeve 159 changes its length to accommodate itself to the changes in distance between the flanges 156 and 157, and thus at all times provides a gas-tight seal between the tube section 34² and the atmosphere.

The present invention thus makes possible a furnace of the type indicated in which the tubes are free of the rapid deterioration and other disadvantages of metal heating tubes; and in which the tubes although formed of refractory material are of a construction which successfully solves the problems arising out of the lack of flexibility and relative brittleness of non-metallic refractory materials and hitherto retarding the use in furnaces of heating tubes formed of such materials.

Tubes embodying the invention deteriorate very slowly, if at all, and do not break, fracture or chip because of changes in size, shape, or location of the tubes or of their supports, during heating and cooling of the furnace. The tubes do not fracture or break even if in construction of the furnace the supports for the tube are not accurately aligned, since the tube sections can bend at the ball-and-socket joints. The installation costs of the tubes are low, and their maintenance cost is extremely low because of their long life.

Despite the fact that the tubes are jointed, there is little if any leakage of gases from the tubes into the heated chamber through the tube joints, because of the longitudinal compressive force exerted on the tubes which hold the tube sections primarily together.

Furnaces embodying the tubes of the invention may be operated for long periods at extremely high temperatures, of as great as 3000° F. or more, without harm to the tubes. Indeed, any limitations which are imposed on the temperatures employed or on the life of the furnace in general are imposed by the deterioration of the structure of the furnace other than the tubes.

Various changes or modifications may be made in the embodiment of the invention illustrated above, furnaces embodying the invention may be employed for purposes other than those indicated, and other heating apparatus embodying the invention may be devised without departing from the spirit of the invention. Thus, the tubes may be arranged to extend vertically rather than horizontally. Although in the illustrated embodiment each intermediate tube section has a convex surface at one end and a concave surface at the other, it is obvious that the tube may be formed of tube sections of which alternate sections have both ends formed with concave or convex surfaces. Furthermore, different means, such as gravity actuated means, may be employed to exert the longitudinal compressive force on the tubes; and the means for exerting such force on the tubes may be disposed at both ends of the tubes rather than at one end as in the illustrated embodiment. The tube formed of plurality of sections may be supported at different points than that shown or from other portions of the furnace than the wall. Other expedients than that illustrated may be employed to pass the gases through the tubes and maintain therein a sub-atmospheric pressure; such expedients may take the form of a pump or other mechanical pressure-differential inducing means, or a stack draft, or the like. While in the illustrated embodiment the ends of the tube sections are enlarged, this is not necessary although advantageous. Likewise the sealing material disclosed between the tube sections in the illustrated embodiment need not be employed if the cooperating concave and convex surfaces of the joints are accurately formed, although its use is advantageous.

While the tubes are shown as being of circular cross-section, they may, of course, have cross-sections of other shapes.

From the above it is apparent that the invention is not limited to the embodiment disclosed either in whole or in part, and that those skilled in the art may depart from the disclosed embodiment to meet particular demands and exigencies without departing from the spirit and scope of the invention as defined in the following claims.

What is claimed is:

1. A furnace comprising a chamber adapted to be heated; a tube in heat exchange relation with said chamber comprising a plurality of tube sections formed of non-metallic, refractory material abutting end-to-end with adjacent abutting end surfaces which are substantially portions of surfaces of concentric spheres, whereby each of said spherical abutting surfaces fits closely with the adjacent substantially concentric and spherical abutting end surface in a ball-and-socket joint which permits limited universal angular movement between adjacent tube sections having said spherical abutting surfaces; means for supporting said tube sections while permitting limited angular movement thereof; and means operating on an end of said tube for exerting on the tube a longitudinal compressive force which holds said tube sections together in abutting relation so that each of said ball-and-socket joints is substantially gas-tight within the range of universal angular movement of said tube sections.

2. The apparatus of claim 1 in which the tube sections having said spherical end surfaces have portions of increased wall thickness in the vicinities of said spherical end surfaces.

3. In a furnace having a tube in heat exchange relation therewith, a plurality of tube sections of refractory material abutting end-to-end, the abutting surfaces of said tubes mating on a spherical surface having a radius greater than the maximum radius of the outside diameter of the tube sections adjacent the abutting surfaces, and means to maintain a compression load on said tube sections as the train of abutting tubes increases in length due to thermal expansion of the tube sections or shorten in length due to angular movement of the tube sections with respect to each other.

4. A furnace comprising a chamber adapted to be heated and having a wall which distorts due to expansion or contraction on changes in temperature; a tube in heat exchange relation with said chamber, said tube comprising a plurality of tube sections formed of non-metallic, refractory material disposed in end-to-end relation with their end surfaces abutting, each of the abutting end surfaces of said tube sections being a portion of a spherical surface and being shaped to fit closely with its adjacent abutting surface in a ball-and-socket joint which permits limited universal angular movement of said tube sections relative to each other; spaced supporting members for said tube sections which supporting members are carried by said wall and change in location when said wall distorts, said supporting members being generally disposed at the ball-and-socket joints between adjacent tube sections, said supporting members permitting sliding of the tube sections relative to said supporting members and limited angular movement of said tube sections; and means operating on an end of said tube for exerting on the tube a continual longitudinal compressive force which holds said tube sections together in abutting relation so that each of said ball-and-socket joints is substantially fluid-tight over a wide range of relative angular positions of said tube sections.

5. A furnace comprising a chamber adapted to be heated; a tube in heat exchange relation with said chamber, said tube comprising a plurality of tube sections formed of non-metallic, refractory material disposed in end-to-end relation with their end surfaces abutting, each of the abutting end surfaces of said tube sections being a portion of a spherical surface and being shaped to fit closely with its adjacent abutting surface in a ball-and-socket joint which permits limited universal angular movement of said tube sections relative to each other; means for supporting two adjacent tube sections at the ball-and-socket joint therebetween, which supporting means permits sliding of the tube sections relative to said supporting means and permits limited angular movement of said tube sections; and means operating on an end of said tube for exerting on the tube a continual longitudinal compressive force which holds said tube sections together in abutting relation so that each of said ball-and-socket joints is substantially gas-tight over the range of relatively angular positions of said tube sections.

6. A furnace comprising a chamber adapted to be heated and having an exterior wall; a tube in heat exchange relation with said chamber, which tube comprises a plurality of tube sections of non-metallic, refractory material abutting end-to-end and having abutting end surfaces which are substantially portions of spheres, each of said spherical abutting surfaces being shaped to fit closely with the adjacent spherical abutting surface in a ball-and-socket joint which permits angular movement relative to each other of the tube sections having said abutting surfaces, one of said tube sections at an end of said tube passing through said wall and projecting from the exterior surface thereof and being capable of moving with respect to said wall as said furnace and tube expand and contract due to temperature variations; means forming a substantially gas-tight seal between said wall and said tube section passing through said wall; and means operating on an end of said tube for exerting a longitudinal compressive force which holds said tube sections together in abutting relation so that each of said ball-and-socket joints is substantially fluid tight over a wide range of relative angular positions of said tube sections.

7. The apparatus of claim 6 in which said means forming a seal comprises a flexible bellows sleeve member extending between said wall and said projecting end of said tube sections.

8. In a furnace heated by a tube conducting heating fluids, the combination therewith of at least four tube sections of non-metallic, refractory material abutting end-to-end, the abutting surfaces of said tubes mating on a spherical surface having a radius greater than the maximum radius of the inside diameter of the tube sections adjacent the abutting surfaces, and means to maintain a floating compression load on said tube sections as the train of abutting tubes increases or decreases in length due to thermal conditions of the tube sections or shortens in length due to angular axial movement of the tube sections with respect to each other.

9. In a furnace having end and side walls and a roof forming a heating chamber, the combination therewith of a heating tube axially slidably supported on a side wall, abutting an end wall at one end, intersecting the heating chamber, and having an opposite end portion slidable through and extended outwardly of the opposite end wall, the tube having a plurality of complementary end-jointed ball-and-socket non-metallic, refractory unit sections between and ball-and-socket end-jointed to the ends, and providing gas-leakproof joints over a material range of relative angular axial distortion of adjacent sections, a lever pivotally mounted intermediate its ends on and exteriorly of said last-mentioned end wall and connected at one end to the extended end of the tube, and a compression spring mounted at one end on said last-mentioned end wall and bearing at its opposite end upon the opposite end of the lever.

10. In a furnace having walls forming a heating chamber, and a support carried by one of said walls, the combination therewith of a heating tube for carrying products of combustion and comprised of at least four non-metallic refractory tubular sections, bearing end-to-end, adjacent end portions of said sections having mating annular surfaces, one of said surfaces being concave and the other convex, to provide a ball-and-socket joint whereby adjacent tube sections can move angularly with respect to each other in limited universal movement and still maintain a leakproof joint, the said support carrying said tube sections at said joint and restraining said tube from substantial transverse movement relative to said wall, a first means engaging one end of said tube to impart a floating longitudinal compression load thereon and a second means, which is fixed, engaging the other end of said tube to oppose said first means, whereby said mating surfaces of adjacent tube sections are maintained in contact as said wall moves.

11. In a heating having walls forming a heating chamber, means for effecting heat transfer within the chamber comprising a tube having at least four complementary end-jointed balland-socket non-metallic, refractory unit sections providing gas-leakproof joints over a material range of relative axial distortion of adjacent sections, the tube being mounted at its joints on the housing walls so as to be axially slidable and otherwise fixed relatively thereto, and a floating compression load applied to and longitudinally of the tube to maintain compactness of the tube sections both by making effective the shortening of tube length due to relative distortion of adjacent sections and by permitting variations of tube length under varied heat conditions.

12. In a housing having walls forming a heating chamber, means for heating the chamber comprising a heating tube axially slidably supported by the walls and partaking of the distortions of the latter, the tube having at least four complementary end-jointed ball-and-socket non-metallic, refractory unit sections providing gas-leakproof joints over a material range of relative axial distortion of adjacent sections, of which one end section is fixed and the other end section is slidably mounted and a floating compression load applied to the tube and continuously adjusting the sections into compact relation at the shortest tube length as said length varies according to heating and distortion conditions.

13. In a chamber for effecting heat transfer at high temperatures between fluids of different chemical composition, the subcombination comprising a tube of non-metallic, refractory material consisting of at least four relatively angularly movable hollow tubular sections abutting end-to-end, and adjacent end surfaces on said sections which are spherically concave and convex, respectively, about a substantially common center falling within and on the center line of said tube section having the convex end surface, whereby when the tube formed of the sections has one end section fixed and the opposite end section slidably mounted, said sections may move angularly with respect to each other without permitting substantial intermingling between the fluid surrounding said tube with a different fluid contained in said tube.

14. The subcombination recited in claim 13 including, between said concave and convex surfaces, a sealing material which is a viscous liquid at the operating temperatures of the chamber in which said tube is employed.

15. A heat transfer tube section for use in a chamber for effecting heat transfer at high temperature between the exterior and interior of the tube, said section comprising a length of hollow tubing of non-metallic, refractory material and end portions on said tubing having surfaces each spherically configured about a center substantially on the center line of said tubing and having a radius greater than one-half of the inner diameter of the tubing adjacent the end portions, whereby when an end portion of said tube section is abutted against a complementarily configured end portion of another tube section said tube sections may move relatively through a limited universal angle, and whereby when a hot fluid conduit is formed of a plurality of the tube sections placed end to end, with an end section fixed in the chamber wall and an opposite end section slidable in an opposed chamber wall, and with at least two tube sections intermediate the end sections, and a floating compression load applied to the slidable end section, compactness of the tube sections is maintained to compensate for the shortening of the conduit length due to relative distortion of adjacent sections and for variations of conduit length due to varied heat conditions.

16. A heat-transfer tube section for use in a chamber for effecting heat transfer at high temperatures between the interior and exterior of the tube, said section comprising a length of hollow tubing of non-metallic, refractory material, a spherically convex end on said tubing, and a spherically concave end on said tubing, each of said ends having a center falling substantially on the center line of said tubing and a spherical radius greater than one-half of the inner diameter of the tube adjacent said ends, whereby when a hot fluid conduit is formed of a plurality of the tube sections placed end to end, with an end section fixed in the chamber wall and an opposite end section slidable in an opposed chamber wall, and with at least two tube sections intermediate the end sections and a floating compression load applied to the slidable end section, compactness of the tube sections is maintained to compensate for the shortening of the conduit length due to relative distortion of adjacent sections and for variations of conduit length due to varied heat conditions.

17. A heat-transfer tube section as defined in claim 15 in which said end portions are spherically convex, and in which the assembly for the stated effects comprises sections alternately arranged with similar sections whose end portions are spherically concave to form the conduit.

18. A heat-transfer tube section as defined in claim 15 in which said end portions are spherically concave, and in which the assembly for the stated effects comprises sections alternately arranged with similar sections whose end portions are spherically convex to form the conduit.

19. In a furnace having walls forming a heating chamber, the combination therewith of a heating tube axially slidably supported by the walls and having at least four complementary end-jointed ball-and-socket non-metallic, refractory unit sections providing gas-leakproof joints over a material range of relative axial distortion of adjacent sections, the tube partaking of the distortions of the furnace wall, intersecting the heating chamber, and having an end section anchored in a furnace wall and an opposite end section slidable through a furnace wall, and means applying a floating compression load to the last-mentioned end section of the tube.

KENNETH W. STOOKEY.

REFERENCES CITED

The following references are of record in the file of this patent:

UNITED STATES PATENTS

| Number | Name | Date |
|---|---|---|
| 2,169,966 | Pfanstiehl | Aug. 15, 1939 |
| 2,219,894 | Hamlink | Oct. 29, 1940 |

FOREIGN PATENTS

| Number | Country | Date |
|---|---|---|
| 361,545 | Great Britain | Nov. 26, 1931 |

OTHER REFERENCES

"Blast Furnace Construction," by J. E. Johnson, 1st edition, 1917, McGraw-Hill Book Co., New York, N. Y., pp. 278–282.

Certificate of Correction

Patent No. 2,472,497.

June 7, 1949.

KENNETH W. STOOKEY

It is hereby certified that error appears in the printed specification of the above numbered patent requiring correction as follows:

Column 14, lines 72 and 73, claim 11, for the word "heating" read *housing*; and that the said Letters Patent should be read with this correction therein that the same may conform to the record of the case in the Patent Office.

Signed and sealed this 8th day of November, A. D. 1949.

[SEAL]

THOMAS F. MURPHY,
*Assistant Commissioner of Patents.*